United States Patent [19]

Rowland et al.

[11] Patent Number: 4,779,977
[45] Date of Patent: Oct. 25, 1988

[54] HIGH OPTICAL EFFICIENCY DUAL SPECTRA PYROMETER

[75] Inventors: John D. Rowland, Palm Beach Gardens; Ernesto Suarez-Gonzalez, Tequesta, both of Fla.

[73] Assignee: United Technologies Corporation, Hartford, Conn.

[21] Appl. No.: 798,211

[22] Filed: Nov. 14, 1985

[51] Int. Cl.⁴ ............................................. G01J 5/18
[52] U.S. Cl. ...................................... 356/45; 356/43; 374/127
[58] Field of Search ................... 356/43, 45; 374/120, 374/121, 127, 210

[56] References Cited

U.S. PATENT DOCUMENTS

| 4,222,363 | 9/1980 | Gebhart | 356/45 |
| 4,326,798 | 4/1982 | Kahn | 356/45 |
| 4,616,137 | 10/1986 | Goff et al. | 250/227 X |

OTHER PUBLICATIONS

T. G. R. Beynon, "Radiation Thermometry Applied to the Development and Control of Gas Turbine Engines", *American Institute of Physics*, 1982, pp. 471–477.

W. H. Atkinson, R. R. Strange, "Pyrometer Temperature Measurements in the Presence of Reflected Radiation", *Proceedings of the Conference of the American Society of Mechanical Engineers*, Aug. 1976, pp. 1–8.

Primary Examiner—Eugene R. Laroche
Assistant Examiner—Robert J. Pascal
Attorney, Agent, or Firm—J. Kevin Grogan; Francis J. Maguire, Jr.

[57] ABSTRACT

A high optical efficiency dual spectra pyrometer for measuring the temperature of a target includes an optical guide for collecting and guiding a target optical beam to a detection module which comprises an interference filter and photodetectors adjustably positioned to provide efficient coupling of the target optical beam thereto. The pyrometer additionally includes a signal processor which receives the signals from the photodetectors, as well as signals indicative of an estimated fireball equivalent black body temperature and the spectral width difference between the two detector signals, and provides a compensated temperature signal.

6 Claims, 2 Drawing Sheets

HIGH OPTICAL EFFICIENCY DUAL SPECTRA PYROMETER

TECHNICAL FIELD

This invention relates to optical pyrometers and more particularly to dual spectra optical pyrometers having a high optical efficiency interference filter.

BACKGROUND ART

Dual spectra optical pyrometers are well known in the art and have been used to measure the temperature of turbine blades in an operating jet engine. The radiation or light from the turbine blade is comprised of an emitted component from the blade itself and a reflected component from a fireball within the jet engine. The presence of a reflected component within the light from the turbine blade causes the pyrometer to provide an erroneously high indication of blade temperature.

In the dual spectra optical pyrometer disclosed by Gebhart, et al in U.S. Pat. No. 4,222,663, light from a turbine blade is provided to two pyrometers having different spectral bands whose outputs are subsequently processed to provide an estimate of the magnitude of the reflected energy. Since silicon is typically used for the detectors, an optical filter whose passband is a portion of that of silicon must be positioned in the optical path of one of the pyrometers to generate the needed spectral band difference. To provide an acceptable signal to noise ratio, prior art dual spectra optical pyrometers have spectral bands comprising 0.4 to 0.85 microns for the filtered pyrometer and 0.4 to 1.1 microns for the unfiltered one.

The radiation from the turbine blade must be gathered by the pyrometer and provided to a pair of detectors which converts the optical energy into an electrical signal for subsequent processing. To guide the light from the turbine blade, split it, and provide it to each detector, dual spectra optical pyrometers of the prior art typically use a bifurcated optical fiber bundle. Since less energy is available at lower temperatures overall performance is limited. Consequently, the use of bifurcated optical fiber bundles results in lowered accuracy because of the lower signal to noise ratios for lower temperatures associated therewith. Bifurcated optical fiber bundles are burdened with high production costs as well as high optical losses. Moreover, the durability of bifurcated optical bundles is much less than that of a single optical fiber.

DISCLOSURE OF INVENTION

An object of the present invention is to provide an improved high optical coupling efficiency detection module for use in a dual spectra optical pyrometer. Another object of the present invention is to provide a dual spectra optical pyrometer having high optical coupling efficiency.

According to the present invention, a high optical coupling efficiency detection module used in a dual spectra optical pyrometer for measuring the temperature of a remote target includes a housing that is adapted to receive a target optical beam having a spectral width. Also included is an interference filter that has a reflective layer between the first and second transparent layers, each layer having a thickness. The interference filter, which is adjustably positioned within the housing, receives and divides the target optical beam at the reflective layer into a reflected optical beam and a remainder optical beam that has a remainder spectral width selected to be a portion of the target beam spectral width. The remainder optical beam is guided through the interference filter. The detection module provided according to the present invention includes a first photodetector that is positioned within the housing to receive the reflected optical beam and a second photodetector positioned within the housing for receiving the remainder optical beam. The first and second photodetectors provide electrical signal equivalents of the reflected optical beam and the remainder optical beam, respectively.

According to another aspect of the present invention, a high optical efficiency dual spectra pyrometer for measuring the temperature of a remote target includes an optical guide which receives from the target an optical beam that has a spectral width. The target optical beam has an emitted component from a target and a reflected component from a fireball having an equivalent black body temperature. A housing is adapted to receive the optical guide and provides the target optical beam to an interference filter that includes a reflective layer between a first and second transparent layer, each layer having a thickness. The interference filter, which is adjustably positioned within the housing, receives and further divides the target optical beam at the reflective layer into a reflected optical beam and a remainder optical beam having a remainder spectral width selected to be a portion of the target beam spectral width guided therethrough. The high optical efficiency dual spectra pyrometer provided according to the present invention also includes first and second photodetector means each positioned within the housing to receive the reflected optical beam and the remainder optical beam, respectively. The first and second photodetectors provide an electrical signal equivalent of the reflected optical beam and the remainder optical beam respectively. A signal processor receives the first and second photodetector signals, as well as signals indicative of the magnitude of the remainder spectral width and an estimate of the fireball equivalent black body temperature. A signal processor generates from the first photodetector signal a linearized temperature signal indicative of an equivalent black body temperature as well as generating from the second photodetector signal a linearized temperature signal indicative of an equivalent black body temperature. Moreover, the signal processor generates from the first and second linearized temperature signals a temperature correction signal in dependence on the estimated fireball equivalent black body temperature and the remainder spectral width, and provides a compensated temperature signal from the difference therebetween.

Best Mode for Carrying Out the Invention

Figure 1:
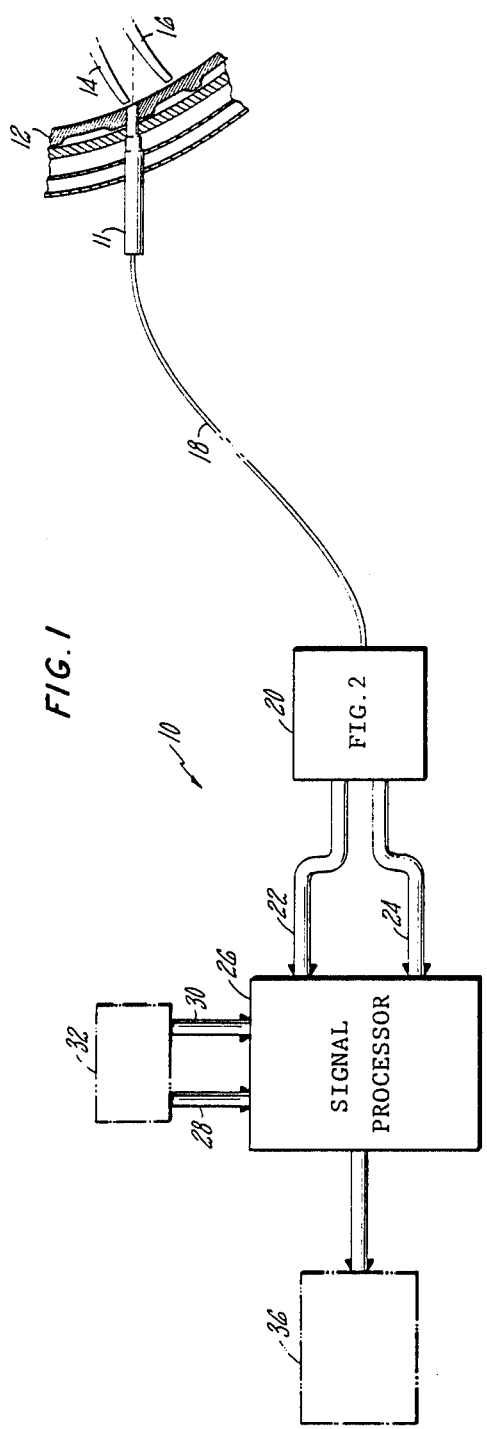
FIG. 1 is an illustration of a simplified block diagram of a high optical efficiency dual spectra pyrometer provided according to the present invention.

Referring first to FIG. 1, in an illustration of a simplified block diagram of a high optical efficiency dual spectra pyrometer provided according to the present invention, a high optical efficiency dual spectra pyrometer 10 includes probe 11 mounted in casing 12 of a jet engine. The probe should be positioned to optically view a target such as rotating turbine blades 14 and 16.

In an operating jet engine the blades of the turbine reach an elevated temperature. As such they emit radiation, the intensity and spectral distribution of which is a function of temperature and can usually be approximated by the well known "black body" approximation. If variation in emissivity are taken into account, the approximation is conventionally referred to as a "grey body". In addition, light from the jet engine fireball or combustion flame is reflected off the turbine blade and also comprises part of the target optical beam. The temperature of the fireball is substantially higher than that of the turbine blade, and as a result the sum of the two light beams produces an equivalent black body spectral energy distribution which yields a temperature much higher than the actual temperature of the turbine blade.

The light from the turbine blades comprises the target optical beam and is collected by the probe. The probe may include lenses and such other conventional optical components, as is necessary to enhance the probe's light gathering and focusing capabilities. In other aspects, the probe is of a conventional design and includes such elements as a housing for the optical fiber, internal optical damping mechanisms, and provisions for purge gas flow through the probe housing. The components of the probe described hereinabove are used in a typical diagnostic pyrometer. Those skilled in the art will recognize that substitutions and modifications can be made depending upon the pyrometer's use as a diagnostic or in-flight pyrometer, and depending on each engine type.

Secured inside the probe is optical guide 18 which receives the target optical beam. Typically the optical guide comprises a fused fiber optic bundle or optical fiber which is of a conventional wide band quartz or fused silica type, such as an Ensign Bickford Optics HC-414-lu fiber. The target optical beam is provided to detection module 20, detailed hereinafter with respect to FIG. 2. In the best mode embodiment the detection module comprises two photodetectors sensitive to the wavelength and intensity of the target optical beam and an interference filter positioned therebetween which provides thereto spectral band portions of the target beam. With a detection module provided according to the present invention, coupling efficiencies into the two photodetectors are typically between 60% and 80% of the entire respective spectral ranges.

The first photodetector provides signals on lines 22 which are indicative of the received energy of the reflected beam and comprises a first signal channel whose spectral band corresponds to that of the target optical beam. Similarly, the second photodetector comprises a second signal channel whose spectral band is limited to a portion of that of the target optical beam and provides signals on lines 24 indicative of the received energy of the remainder optical beam.

These signals are received by signal processor 26 which is of a type known in the art and in the best mode embodiment includes appropriate conventional analog electrical circuits. In addition, the signal processor receives signals on lines 28 and lines 30 from external processing apparatus 32 not shown and not part of the present invention that are indicative of the spectral range of the first photodetector signals and an estimate of the equivalent black body temperature of the fireball.

The signals from the first photodetector are linearized by the signal processor to provide a signal indicative of an equivalent black body temperature for the first signal channel. The signal processor performs the same linearization to the second photodetector signals, yielding signals indicative of an equivalent black body temperature for the second signal channel.

The presence of the reflected energy results in a temperature reading in the first or unfiltered pyrometer which is greater than the true blade temperature. The second or filtered pyrometer will indicate an even higher temperature because the spectral range of the second pyrometer is limited to shorter wavelengths by the interference filter.

The signal processor computes temperature correction signals ($T_c$) and provides compensated temperature sigals ($T_t$) on lines 34 to external signal processor 36 by relating the temperature correction signals to the unfiltered temperature signals ($T_u$) such that $$T_t = T_u - T_c \qquad (1)$$

In order to accurately compute temperature correction signals, the signal processor must receive (1) the linearized temperature signals, (2) signals indicative of the spectral width of the filter pyrometer, and (3) signals indicative of an estimate of the equivalent black body temperature of the fireball. In addition, temperature correction signals are a function of the percent of reflected energy in the target optical beam, a parameter often expressed as the difference between the linearized filtered temperature ($T_f$) and the linearized unfiltered temperature ($T_u$) or ($T_f - T_u$).

As is well known in the art, the percent reflected energy in the target beam can vary approximately from 0 to 50% before rendering the pyrometer signals unacceptable, given only an estimate of the equivalent black body temperature of the fireball. As a result, there is a functional relationship between the magnitude of the temperature correction ($T_c$) signal and the percent of reflected energy ($T_f - T_u$), for a given linearized unfiltered temperature signal magnitude. With only an estimated fireball equivalent black body temperature the error in the temperature correction signal is small when the percent reflected energy is less than 50%. For example, given an etimated fireball equivalent black body temperture of 4500° F., and a 50% reflected energy component, the magnitude of error is less than approximately 30° F., even though the estimated fireball temperature can be off by 300° F. Continuing with the example, if the percent reflected energy is less than 50%, the family of curves ($T_c$ v. ($T_f - T_u$)) resulting from multiple values of unfiltered temperature can be approximated by a single equation using conventional curve fitting techniques, yielding $$T_t = T_u - [(0.3 T_u - 150/(3500 - T_u)](T_f - T_u)^{1.28} \qquad (2)$$

where, as above, $T_t$ is the compensated temperature, $T_u$ is the unfiltered temperature, $T_f$ is the filtered temperature.

Those skilled in the art will note that other empirically derived equations can be obtained for other fireball equivalent black body temperatures.

Moreover, it is also apparent to those skilled in the art that alternative algorithms employing either analog or digital means can be substituted. Specifically, a digital embodiment of the signal processor includes a high speed computer with conventional computer memory and analog-to-digital converters which generate and store in memory temperature correction signals similar to those described hereinabove in conventional look-up table format, with compensated temperature signals obtainable therefrom by conventional techniques.

Figure 2:
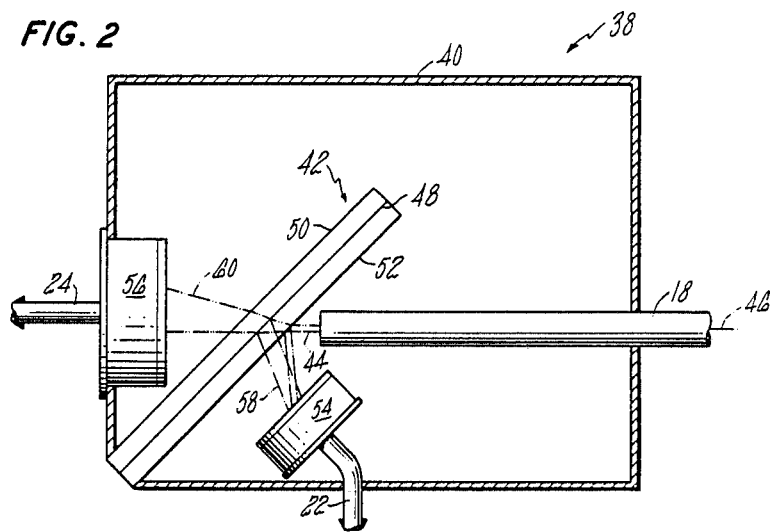
FIG. 2 is a sectioned illustration of a high optical efficiency detector module for use with the optical pyrometer of FIG. 1.

FIG. 2 is a sectioned illustration of a high optical efficiency detection module 38 provided according to the present invention. The detection module includes housing 40 which is conventional and in the best mode embodiment comprises machined aluminum. An interference filter 42 is positioned in the housing to receive target optical beam 44 from the optical fiber (18, FIG. 1). The optical fiber is positioned by conventional techniques and defines an optic axis 46.

The interference filter is of a conventional type and in the best mode embodiment comprises a Corion LS 850-B-1483-A347 interference filter. As is well known in the art, an interference filter comprises an alternating series of dielectric reflective layers 4B sandwiched between two transparent layers, such as glass layers 50 and 52. The interference filter removes unwanted wavelengths by the interference phenomenon rather than by absorption or scattering. The use of several dielectric layers allow tailoring of the band-pass of the filter, and results in filters which are almost loss-less. By making several layers of alternate high and low refractive index dielectrics it is possible to reinforce the reflectivity of a single boundary and build it up by multiple reflection to any desired value. It is necessary only that the layers be of such thickness that the reflections from successive layers are in phase. In the best mode embodiment the interference filter has a reflective layer approximately 3 microns thick surrounded by glass layers approximately 0.0062 of an inch thick.

When the interference filter is placed in an approximate 15° angle with respect to the incoming target beam propagating along the optic axis, approximately 4% of the available energy in the beam is reflected off the front surface of the glass. At the reflective layer approximately 99% of the 0.85 micron to 1.2 micron energy is reflected and approximately 75% of the 0.4 to 0.85 micron energy is allowed to pass through. The back surface of the glass reflects approximately 4% of the 0.4 micron to 0.85 micron energy. Consequently, there remains approximately 65% of the 0.4 micron to 0.85 micron target optical beam energy passed through the interference filter.

The optical coupling efficiency of the detector module is a function of wavelength. For black body radiation at 1500° F., long wavelengths (0.4 to 1.2 microns) have a coupling efficiency of between 66% and 88%. The short wavelength efficiency (typically 0.4 to 0.85 microns) is approximately 60%. This represents a substantial improvement over the prior art optical pyrometer systems which employ bifurcated fiber optic bundles whose short and long wavelength coupling efficiencies were 30% and 40% respectively.

In addition, the coupling efficiency and passband of an optical interference filter are a function of angular position with respect to the incoming target beam. In the best mode embodiment the filter is placed at an angle of approximately 15° off the normal to the input target optical beam. This directs most of the reflected energy into the unfiltered photodetector 54 while providing a passband as indicated hereinabove.

Photodetectors 54 and 56 receive the unfiltered, reflected optical beam 58 and remainder optical beam 60, respectively. In the best mode embodiment the photodetectors each comprise conventional silicon photodetectors. Silicon has a passband whose spectral width is approximately 0.4 to 1.1 microns. Those skilled in the art will recognize that other photodetectors comprising different materials may be substituted for one or both photodetectors. Such a substitution may require a different interference filter whose passband is selected to match the choice of photodetector material. Other equivalent photodetector materials include indium gallium arsenide.

The photodetectors 54 and 56 provide electrical signal equivalents of the reflected beam and the remainder beam on lines 22 and 24, respectively.

Figure 3:
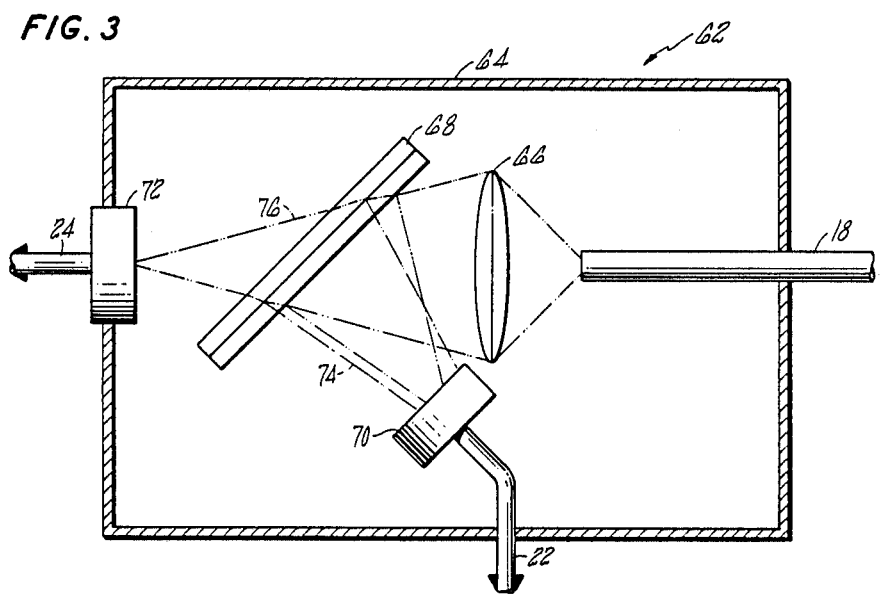
FIG. 3 is a sectioned illustration of an alternative embodiment of the high optical efficiency detection module of FIG. 2.

FIG. 3 is a drawing of an alternative embodiment of the high efficiency optical module of FIG. 2. In order to accommodate optical fibers having large numerical apertures and/or photodetectors with small active areas, an alternative embodiment 62 of the detector module of FIG. 1 may be used without degradation in coupling efficiency. Included in the embodiment are housing 64 which positions optical fiber (18, FIG. 1). Optical fibers with large numerical apertures (approximately 0.4 and greater) result in an unacceptable amount of spread by the target optical beam as it exits the fiber. Consequently, aspherical lens 66 is positioned by conventional techniques within the housing so as to collect all of the emitted light from the optical fiber. The aspheric lens has a low F number, such as 0.7, and is an otherwise conventional aspheric lens.

In all other aspects the alternative embodiment of FIG. 3 is identical with the detection module of FIG. 2, including interference filter 68 and photodetectors 70 and 72. As in the detection module of FIG. 2, the photodetectors 70 and 72 provide electrical signal equivalents of the reflected beam and remainder beam on line 22 and 24, respectively. The focal length of the aspheric lens is not critical, and need only be selected so as to provide all of the energy in reflected beam 74 and remainder beam 76 to the active area of the photodetectors.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. A high optical coupling efficiency detection module for use in a dual spectra optical pyrometer for measuring the temperature of a remote target, comprising:

housing means adapted to receive a target optical beam having a spectral width, interference filter means positioned within said housing means for receiving and dividing said target optical beam into a reflected optical beam and a remainder optical beam having a remainder spectral width selected to be a portion of said target beam spectral width, first photodetector means positioned within said housing to receive said reflected optical beam for providing an electrical signal indicative thereof and, second photodetector means positioned within said housing means for receiving said remainder optical beam and providing an electrical signal indicative thereof.

2. A high optical efficiency dual spectra pyrometer for measuring the temperature of a remote target, comprising:

optical guide means for receiving from the target an optical beam having a spectral width and having an emitted component from the target and a reflected component from a fireball having an equivalent black body temperature, housing means adapted to receive said optical guide means, interfernce filter means positioned with said housing means for receiving from said optical guide means and dividing said target optical beam into a reflected optical beam and a remainder optical beam having a remainder spectral width selected to be a portion of said target beam spectral width, first photodetector means positioned within said housing to receive said reflected optical beam for providing an electrical signal indicative thereof, second photodetector means positioned within said housing means for receiving said remainder optical beam and providing an electrical signal indicative thereof, signal processing means for receiving said first and second photodetector signals and for further receiving signals indicative of the magnitude of said remainder spectral width and an estimated said fireball equivalent black body temperature, said signal processor means for generating from said first photodetector signal a linearized temperature signal indicative of an equivalent black body temperature, generating from said second photodetector signal a linearized temperature signal indicative of an equivalent black body temperature, generating from the difference of said first linearized temperature signal and said second linearized temperature signal a temperature correction signal in dependence on said estimated fireball equivalent black body temperature and said remainder spectral width, and providing a compensated temperature signal from the difference between said first temperature signal and said temperature correction signal.

3. The high optical efficiency detection module of claim 1, wherein said photodetector means comprises silicon.

4. The high optical efficiency detection module of claim 1, wherein said first photodetector means comprises indium gallium arsenide and said second photodetector means comprises silicon.

5. The high optical efficiency dual spectra pyrometer of claim 2, wherein said photodetector means comprises silicon.

6. The high optical efficiency dual spectra pyrometer of claim 2, wherein said first photodetector means comprises indium gallium arsenide and said second photodetector means comprises silicon.

* * * * *